US012279021B2

(12) United States Patent
Patnaik et al.

(10) Patent No.: US 12,279,021 B2
(45) Date of Patent: Apr. 15, 2025

(54) METHOD FOR SERVING INTERACTIVE DIGITAL ADVERTISING CONTENT TO A USER WITHIN A STREAMING PLATFORM

(71) Applicant: Yieldmo, Inc., Nashua, NH (US)

(72) Inventors: Sambit Patnaik, Nashua, NH (US); Jarrod Dowalter, Nashua, NH (US)

(73) Assignee: Yieldmo, Inc., Nashua, NH (US)

( * ) Notice: Subject to any disclaimer, the term of this patent is extended or adjusted under 35 U.S.C. 154(b) by 0 days.

(21) Appl. No.: 18/386,711

(22) Filed: Nov. 3, 2023

(65) Prior Publication Data
US 2024/0155208 A1    May 9, 2024

Related U.S. Application Data

(60) Provisional application No. 63/422,688, filed on Nov. 4, 2022.

(51) Int. Cl.
*H04N 21/81* (2011.01)
*H04N 21/431* (2011.01)
*H04N 21/4725* (2011.01)

(52) U.S. Cl.
CPC ....... *H04N 21/812* (2013.01); *H04N 21/4316* (2013.01); *H04N 21/4725* (2013.01)

(58) Field of Classification Search
CPC .................................................. H04N 21/812
See application file for complete search history.

(56) References Cited

U.S. PATENT DOCUMENTS

2017/0300914 A1* 10/2017 Li ........................ G06Q 20/322

* cited by examiner

*Primary Examiner* — Michael H Hong
(74) *Attorney, Agent, or Firm* — Run8 Patent Group, LLC; Peter Miller; Leah Raddatz (57) ABSTRACT

One variation of a method includes, during a pause event that pauses playback of a digital video rendered within a display of a primary device: triggering playback of a video advertisement rendered in replacement of the digital video during the pause event; and, during playback of the video advertisement, rendering a digital identifier within the display, the digital identifier including a pointer to an electronic document including content associated with the video advertisement. The method further includes, during playback of the video advertisement, in response to a scan event that captures the digital identifier and initiated at a secondary device distinct from the primary device: pausing playback of the video advertisement at the primary device; triggering playback of the digital video, in replacement of the video advertisement, at the primary device; and triggering the secondary device to navigate to the electronic document based on the pointer.

20 Claims, 5 Drawing Sheets

METHOD FOR SERVING INTERACTIVE DIGITAL ADVERTISING CONTENT TO A USER WITHIN A STREAMING PLATFORM

CROSS-REFERENCE TO RELATED APPLICATIONS

This Application claims the benefit of U.S. Provisional Application No. 63/422,688, filed on 4 Nov. 2022, which is incorporated in its entirety by this reference.

TECHNICAL FIELD

This invention relates generally to the field of digital advertising and more specifically to a new and useful method for serving interactive advertising content in the field of digital advertising.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
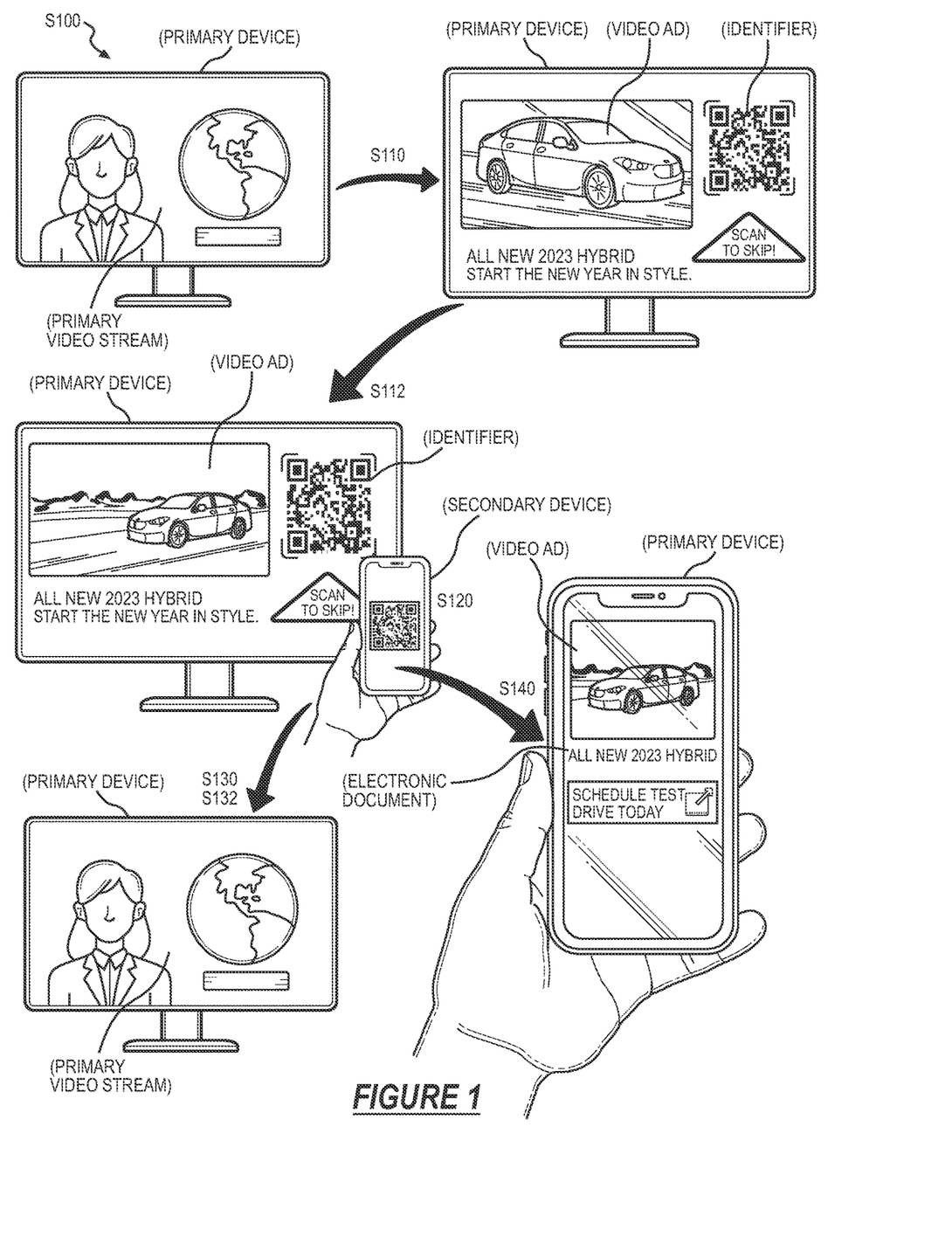
FIG. 1 is a flowchart representation of a method.
Figure 2:
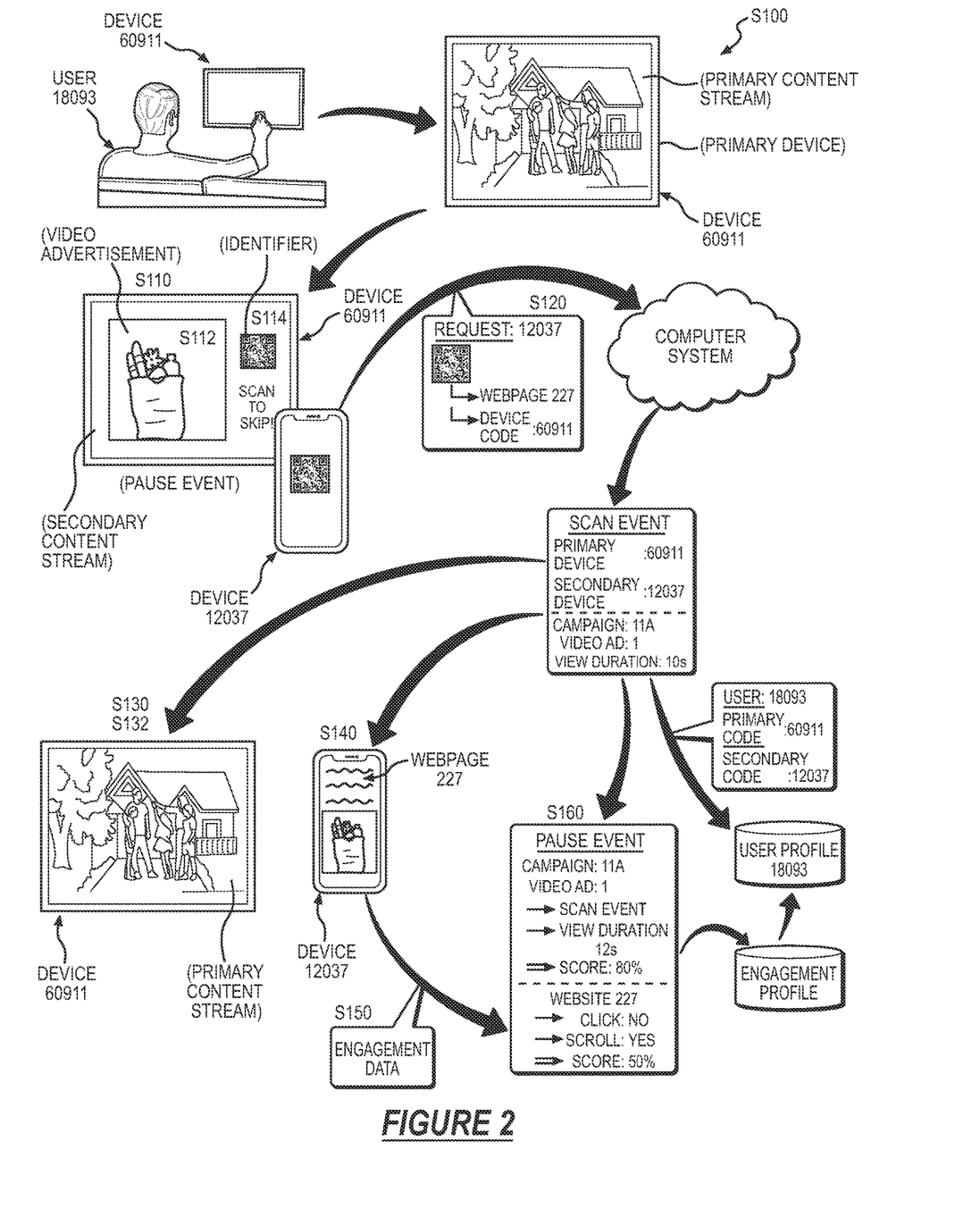
FIG. 2 is a flowchart representation of the method.
Figure 3:
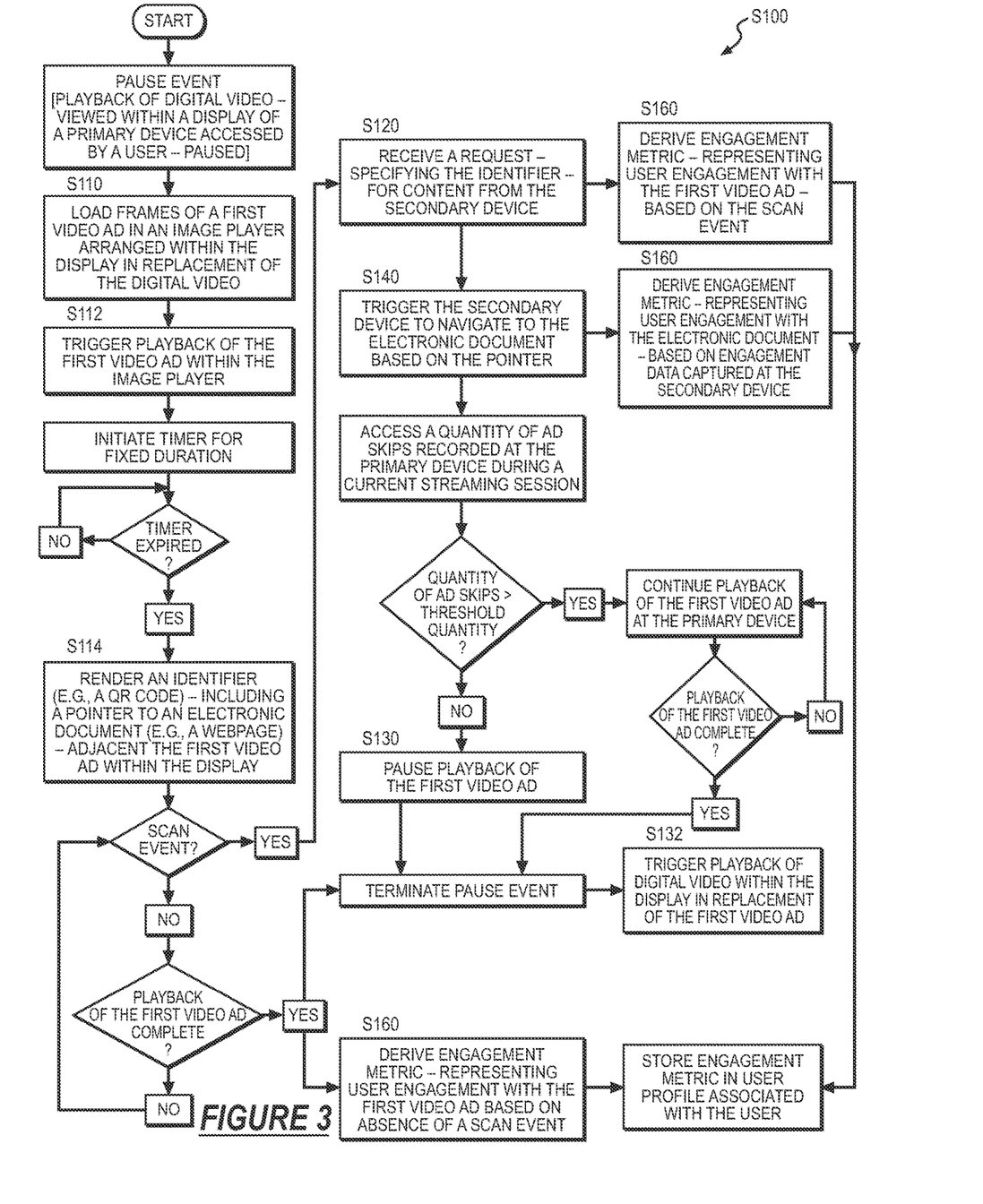
FIG. 3 is a flowchart representation of the method.
Figure 4A:
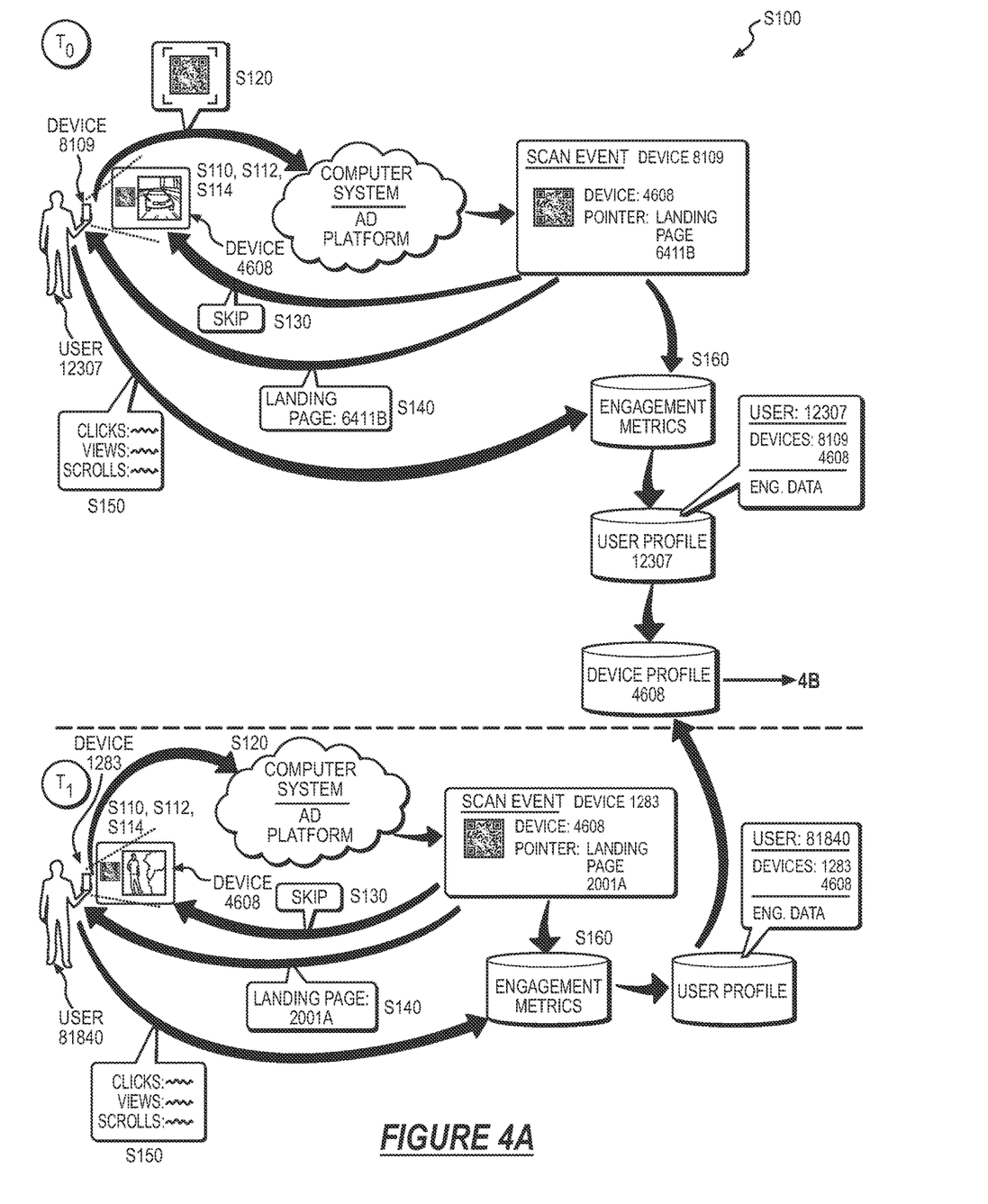
FIGS. 4A and 4B are flowchart representations of the method.
Figure 4B:
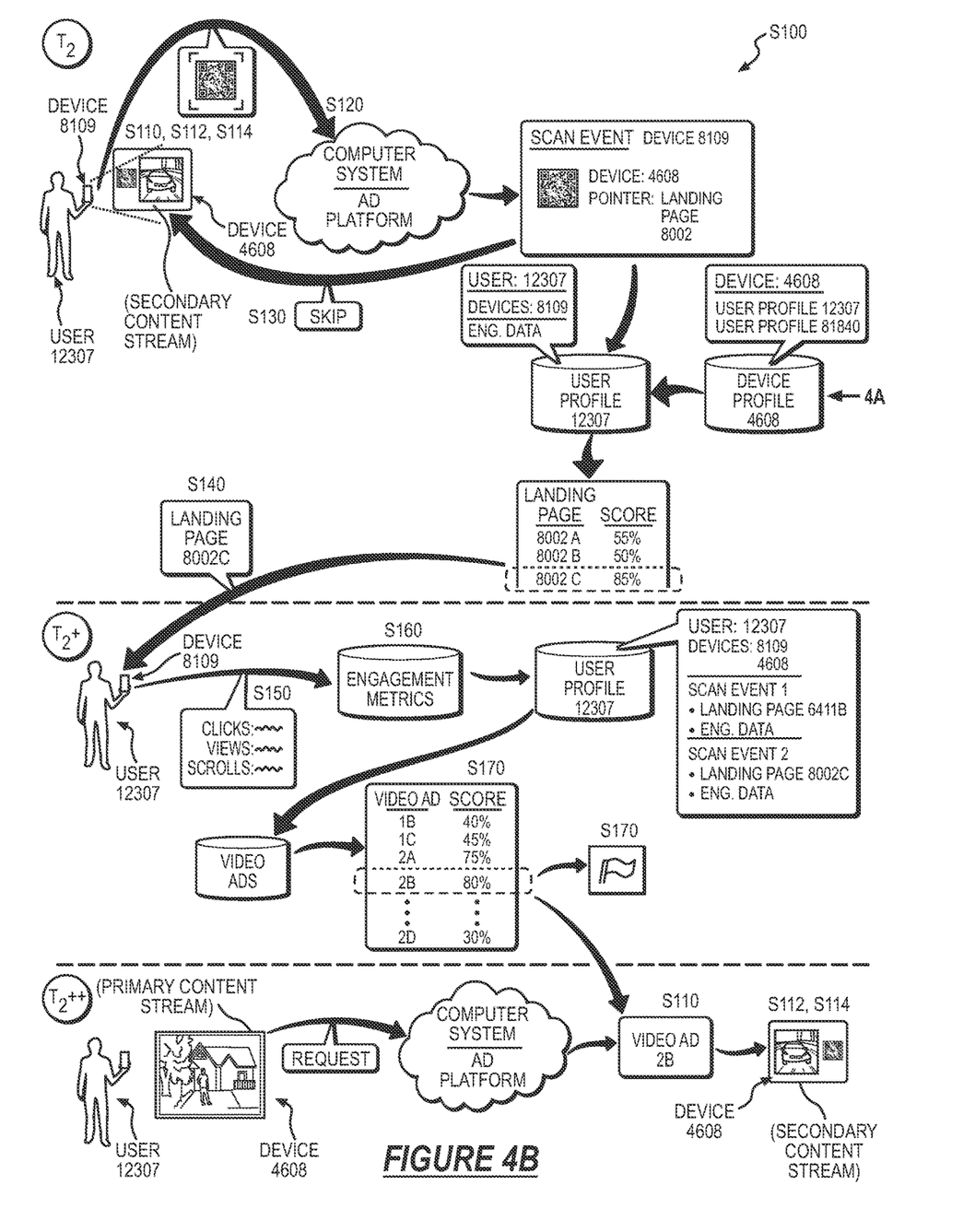

As shown in FIGS. 1, 2, 3, 4A, and 4B, a method S100 includes, during a first pause event that pauses playback of a primary content stream at a first frame in a digital video in the primary content stream, the primary content stream viewed on a display of a primary device accessed by a user, triggering playback of a first video advertisement in a secondary content stream within an image player arranged within a first subregion of the display in Block S112. The method S100 further includes, during playback of the first video advertisement during the first pause event: rendering a first digital identifier within a second subregion of the display in Block S114, the first digital identifier including: a first pointer to a first electronic document including content associated with the first video advertisement and a device code associated with the primary device; and, in response to a first scan event that captures the first digital identifier and initiated at a secondary device accessed by the user and distinct from the primary device, receiving a first request for content from the secondary device, the first request specifying the first identifier in Block S120. The method S100 further includes, in response to the first request specifying the first identifier: pausing playback of the first video advertisement within the secondary content stream based on the device code; rendering the first frame in the digital video within the display of the primary device in replacement of the secondary content stream in Block S130; triggering playback of the digital video in the primary content stream at the primary device in Block S132; and triggering the secondary device to navigate to the first electronic document based on the first pointer in Block S140.

As shown in FIGS. 1, 2, 3, 4A, and 4B, one variation of the method S100 includes, during a first pause event that pauses playback of a digital video viewed on a display of a primary device: loading frames of a first video advertisement into an image player arranged within a first subregion of the display in Block Silo; triggering playback of the first video advertisement within the image player in Block S112; and rendering a first digital identifier within a second subregion of the display, the first digital identifier including a first pointer to a first electronic document including content associated with the first video advertisement in Block S114. In this variation, the method S100 further includes, during playback of the first video advertisement during the first pause event, in response to a first scan event that captures the first digital identifier and initiated at a secondary device distinct from the primary device: triggering the secondary device to navigate to the first electronic document based on the first pointer in Block S140; pausing playback of the first video advertisement based on the first digital identifier in Block S130; and triggering playback of the digital video, in replacement of the first video advertisement, at the primary device in Block S132. In this variation, the method S100 further includes, in response to triggering the secondary device to navigate to the first electronic document: accessing a first set of engagement data representing user interactions with content presented within the first electronic document in Block S150; deriving a first engagement metric, in a set of engagement metrics, representing user engagement with the first video advertisement based on the first scan event in Block S160; and deriving a second engagement metric, in the set of engagement metrics, representing user engagement with the first electronic document based on the first set of engagement data in Block S160.

In one variation, the method S100 further includes, based on the set of engagement metrics, selecting a second video advertisement, in a set of video advertisements, for presenting to the user within the secondary content stream in Block S170. In this variation, the method S100 further includes, during a second pause event that pauses playback of the primary content stream at a second frame in the digital video, the second pause event succeeding the first pause event: loading frames of the second digital advertisement in the image player in the secondary content stream rendered in replacement of the primary content stream in Block Silo; triggering playback of the second video advertisement in the secondary content stream within the image player in Block S112; and, during playback of the second video advertisement during the second pause event, rendering a second digital identifier within the second subregion of the display, the second digital identifier including a second pointer to a second electronic document—including content associated with the second video advertisement—and the device code associated with the primary device in Block S114.

As shown in FIGS. 1, 2, 3, 4A, and 4B, one variation of the method S100 includes, during a pause event that pauses playback of a digital video in a primary content stream rendered within a display of a primary device: triggering playback of a video advertisement in a secondary content stream within an image player arranged within a first subregion of the display in Block S112, the secondary content stream rendered in replacement of the primary content stream during the pause event in Block Silo; and rendering a digital identifier within a second subregion of the display, the digital identifier including a pointer to an electronic document including content associated with the video advertisement in Block S114. In this variation, the method S100 further includes, during playback of the video advertisement during the pause event, in response to a first scan event that captures the digital identifier and initiated at a secondary device distinct from the primary device: pausing playback of the video advertisement at the primary device in Block S130; rendering the first frame in the digital video within the display of the primary device in replacement of the secondary content stream; triggering playback of the digital video in the primary content stream at the primary device in Block S132; and triggering the secondary device to navigate to the electronic document based on the pointer in Block S140.

As shown in FIGS. 1, 2, 3, 4A, and 4B, one variation of the method S100 includes, during a first pause event that pauses playback of a primary content stream at a first frame in a digital video in the primary content stream—viewed on a display of a streaming device (e.g., television, computer, mobile phone) accessed by a user—rendering a first advertisement card in an ad stream within the display of the streaming device in replacement of the first frame in the digital video in Block S110, the first advertisement card including: an image player—arranged within a first subregion of the first advertisement card—loaded with a first video advertisement; and a first digital identifier (e.g., a QR code)—arranged within a second subregion of the advertisement card—containing a first pointer to a first electronic document including advertising content associated with the first video advertisement and a device code (e.g., a character string) linked to the streaming device. The method S100 further includes, during the first pause event, triggering playback of the first video advertisement within the image player in Block S112, and, in response to a first scan event that captures the first digital identifier on a secondary device (e.g., a smartphone, a tablet) accessed by the user: receiving a first request—specifying the first identifier—for advertising content from the secondary device in Block S120; pausing playback of the first video advertisement within the ad stream in Block S130; rendering the first frame in the digital video within the display of the streaming device in replacement of the ad stream; triggering playback of the digital video in the primary content stream at the streaming device in Block S132; and triggering the secondary device to navigate to the first electronic document associated with the first video advertisement in Block S140.

In one variation, the method S100 further includes, during a second pause event—succeeding the first pause event and within a streaming session including the first pause event—that pauses playback of the primary content stream at a second frame in the digital video, rendering a second advertisement card in the ad stream within the display of the streaming device in replacement of the second frame in the digital video in Block S110, the second advertisement card including: the image player—arranged within a third subregion of the second advertisement card—loaded with a second video advertisement; and a second digital identifier—arranged within a fourth subregion of the second advertisement card—containing a second pointer to a second electronic document including advertising content associated with the second video advertisement and the device code linked to the streaming device. In this variation, the method S100 further includes, during the second pause event, triggering playback of the second video advertisement within the image player in Block S112, and, in response to a second scan event that captures the second digital identifier on the secondary device: receiving a second request—specifying the second identifier—for advertising content from the secondary device in Block S120; accessing a quantity of skip events (e.g., a quantity of video advertisements skipped) recorded for the user during the streaming session; and, in response to the quantity of skip events exceeding a threshold quantity defined for the streaming session, continuing playback of the second video advertisement at the streaming device in Block S132 and triggering the secondary device to navigate to the second electronic document in Block S140.

2. Applications

Generally, the method S100 can be executed by an advertising (or "ad") platform to: serve a video advertisement to a user—viewing a primary content streaming content on a streaming device (e.g., Smart TV, computing device, mobile phone)—during a break or pause in playback of the primary content streaming content; pair the video advertisement with a digital identifier (e.g., a QR code) for rendering on a display of the streaming device (e.g., adjacent frames of the video advertisement) concurrent playback of the video advertisement on the display; and—in response to a scan event that captures the digital identifier on a secondary device (e.g., a smartphone or tablet including an integrated camera) accessed by the user—trigger the secondary device to navigate to an electronic document loaded with ad content associated with the video advertisement, and trigger the streaming device to automatically resume playback of the primary content streaming content.

In particular, the method S100 can be executed by an ad platform (and/or an ad tech vendor, a publisher, an ad agency, or an online social networking platform, etc.)—in combination with a video streaming platform (e.g., an ad-supported streaming service)—to: render an ad stream during pauses or breaks (e.g., scheduled and/or user-initiated breaks) in the primary content stream; present the user with an advertisement card—including an image player loaded with a video advertisement and a digital identifier arranged adjacent the image player—within the ad stream; and enable user control over playback of the video advertisement and the primary content stream—such as by enabling the user to "skip" playback of the video advertisement and immediately resume playback of the primary content stream—in exchange for the user capturing the digital identifier on the secondary device and thereby accessing additional ad content related to the video advertisement.

Therefore, by enabling the user to terminate playback of the video advertisements and/or selectively access further advertising content on the secondary device, the ad platform can increase likelihood that the user will engage with advertising content and minimize frustration experienced by the user due to video advertisements interrupting the primary content stream. Further, rather than continue playback of a video advertisement that the user may otherwise ignore, the ad platform can encourage the user to view at least a minimum proportion of the video advertisement—such as in order to scan the digital identifier and thus skip playback of a remaining proportion of the video advertisement—and/or view similar or alternative advertising content at the secondary device responsive to scanning of the digital identifier. The ad platform can therefore promote user engagement with ad content related to the video advertisement and thus drive the user toward a target outcome (e.g., video completion, conversion) defined for the video advertisement.

Furthermore, by encouraging the user to capture (e.g., scan) the digital identifier at a secondary device, the ad platform can selectively serve additional advertising content—tailored to the user viewing the ad stream on the streaming device (hereinafter a "primary device")—to the secondary device for presentation to the user. In particular, in one implementation, the ad platform can: predict a current intent of the user to engage with advertising content presented to the user at the secondary device, such as based on a proportion of the video advertisement viewed by the user prior to scanning of the digital identifier, a quantity of advertisements "skipped" by the user during a current streaming session at the primary device, historical engagement data representing user interactions with previous advertising content presented at the primary device, etc.; and, in response to a scan event for the digital identifier, trigger the secondary device to navigate to an electronic document containing tailored advertising content selected for this user based on the predicted intent. For example, the ad platform can trigger the secondary device to navigate to: a webpage corresponding to a brand associated with the video advertisement; a digital checkout portal configured to enable purchases of content advertised in the video advertisement; an image player loaded with the same video advertisement or a next video advertisement in the same advertising campaign; etc. The ad platform can therefore tailor advertising content served to the user responsive to the scan event to promote increased engagement of the user with the advertising content.

Furthermore, by supplying content to the user at both the primary device and at the secondary device—such as responsive to a scan event—the ad platform can characterize user engagement with content (e.g., video advertisements, electronic documents) served to the user at these devices at an increased resolution. In particular, the ad platform can leverage engagement data—captured at both the primary and secondary devices—to derive engagement metrics representative of the user's interest in: a particular video advertisement presented to the user within the secondary content stream at the primary display; and/or content presented within an electronic document served to the user at the secondary device responsive to a scan event that captures an identifier rendered within the secondary content stream adjacent playback of the particular video advertisement. For example, the ad platform can characterize the user's engagement with this particular video advertisement based on: presence or absence of a scan event during playback of the video advertisement; and/or a duration of the video advertisement viewed by the user prior to a scan event. In this example, the ad platform can also characterize the user's engagement with the electronic document based on engagement data captured at the secondary device, such as including: a quantity of scrolls, clicks, swipes, etc., initiated by the user within the electronic document; whether the user completed a purchase at the electronic document; a duration of a browse session within the electronic document; a duration of playback of video content viewed by the user; etc. The ad platform can then leverage these engagement metrics to select future content—including video advertisements presented within the secondary content stream at the primary device and electronic documents served to the secondary device responsive to scan events—for presenting to the user during subsequent pause events.

3. Secondary Content Stream

During a pause event—that pauses playback of the primary content stream—the ad platform can serve an ad stream (hereinafter a "secondary content stream") to the user in replacement of the primary content stream. For example, the ad platform can serve the secondary content stream to the user during pause events scheduled at predefined time intervals (e.g., every five minutes, every fifteen minutes)—within the primary content stream—allocated for serving advertising content to the user. Additionally and/or alternatively, in another example, the ad platform can serve the secondary content stream to the user during pause events initiated by the user, such as responsive to the user manually pausing playback of the primary content stream.

More specifically, in response to initiation of the pause event, the ad platform can render an advertisement card—within the secondary content stream—in replacement of the primary content stream. The advertisement card can include: an image player configured to render and/or play a video advertisement (e.g., selected by the ad platform); and a digital identifier (hereinafter an "identifier")—such as a QR code—arranged adjacent and/or overlaid frames of the video advertisement. Additionally, the advertisement card can include: a call-to-action (or "CTA")—such as a textual statement or icon configured to persuade a user to perform a particular task, such as scanning the identifier with a secondary device (e.g., a smart phone, a tablet), purchasing a product, signing up for a newsletter, etc.—arranged adjacent the identifier and/or video advertisement; a logo or icon associated with a brand associated with the video advertisement; and/or additional textual or visual content related to the video advertisement.

In one example, an advertisement card includes: an image player arranged within a first subregion of the secondary content stream and loaded with a video advertisement selected for presentation to the user; a QR code—linked to an electronic document including content associated with the video advertisement—arranged within a second subregion of the secondary content stream; a CTA—such as reciting "scan to skip", "scan to skip this advertisement", "scan here to resume your show", etc.—arranged within a third subregion, proximal the second subregion, of the secondary content stream; a name of a brand or product associated with content advertised in the video advertisement and/or a logo corresponding to the brand; and/or a short body of text related to content advertised in the video advertisement and arranged in a fourth subregion of the secondary content stream.

3.1 Identifier

The ad platform can render an identifier within the advertisement card—adjacent the video advertisement—rendered on the display of the primary device during the pause event. The identifier can include a pointer to an electronic document (e.g., a webpage, a landing page within a native application), such that—in response to a scan event that captures the identifier on a secondary device accessed by the user—the ad platform can trigger the secondary device to navigate to the electronic document.

In one implementation, the identifier can include: a pointer to an electronic document (e.g., a webpage, a landing page within a native application) associated with the video advertisement; and a device code (e.g., a randomly-generated character string) linked to the primary device, such that the identifier is unique to this particular primary device. The ad platform can therefore: identify a particular primary device associated with a scan event—that captures the identifier on a secondary device (e.g., by capturing an image of the identifier with a camera on the secondary device)—based on this device case; and automatically trigger playback of the primary content stream—in replacement of the secondary content stream—at the particular primary device accordingly.

For example, during a first pause event that pauses playback of a primary content stream—at a first frame of the primary content stream—viewed on a primary device accessed by a user, the ad platform can: serve an advertisement card—including an image player loaded with a video advertisement, a pointer to a webpage associated with the video advertisement, and a unique device code—to a primary device for rendering in replacement of the first frame of the primary content stream; and trigger playback of the video advertisement within the image player. Then, in response to a first scan event—initiated by the user capturing an image of the identifier via a camera integrated into her mobile device—the ad platform can: receive a request—including the identifier—for content from the user's mobile device; link the scan event to the advertisement card presented to the user at the primary device based on the unique device code contained within the identifier; trigger the user's mobile device to navigate to the webpage based on the pointer; and, based on linking of the scan event to the card presented at this particular primary device, automatically render the first frame of the primary content stream—in replacement of the advertisement card—at the primary device and trigger playback of the primary content stream.

The ad platform can therefore generate and serve a unique identifier—linked to a particular primary device—with each instance of a video advertisement served to a population of primary devices. For example, for a first instance of an advertisement card loaded with a video advertisement, the ad platform can: generate a first QR code including a pointer to an electronic document, associated with the video advertisement, and a first device code; and render the first QR code within the first instance of the advertisement card presented within a display of a first primary device accessed by a first user. Then, for a second instance of the advertisement card loaded with the video advertisement, the ad platform can: generate a second QR code including the pointer to the electronic document and a second device code; and render the second QR code within the second instance of the advertisement card presented within a display of a second primary device accessed by a second user. Then, in response to a first scan event that captures the first identifier on the first user's mobile device, the ad platform can: receive a request—including the first identifier—for content from the first user's mobile device; based on the first device code contained in the first identifier, link this first scan event to the first instance of the advertisement card served to the first primary device; render a paused frame of a first primary content stream—in replacement of the first instance of the advertisement card—within the display of the first primary device; and trigger playback of a first primary content stream. Similarly, in response to a second scan event that captures the second identifier on the second user's mobile device, the ad platform can: receive a request—including the first identifier—for content from the second user's mobile device; and, based on the second device code contained in the second identifier, link this second scan event to the second instance of the advertisement card served to the second primary device.

Generally, the ad platform can render the identifier within the secondary content stream concurrent playback of the video advertisement, such as adjacent and/or overlaid the video advertisement. In particular, in one example, the ad platform can: trigger playback of the video advertisement within an image player arranged within a first subregion—defining a first area—of the display of the primary device; and render the digital identifier within a second subregion falling within the first subregion and defining a second area less than the first area, such that the digital identifier is overlaid and/or obscures a portion of the video advertisement. Alternatively, in another example, the ad platform can: trigger playback of the video advertisement within an image player arranged within a first subregion of the display of the primary device; and render the digital identifier within a second subregion adjacent the first subregion, such as adjacent a first edge of frames of the video advertisement.

3.1.1 Static Identifier

In one implementation, the advertisement card can be configured to include a static identifier rendered adjacent playback of a corresponding video advertisement.

In particular, in this implementation, during a pause event that pauses playback of a primary content stream at a primary device, the ad platform can: serve an secondary content stream—including a first advertisement card loaded with a video advertisement and a static identifier linked to an electronic document associated with the video advertisement—to the primary device; and trigger the primary device to render the static identifier—adjacent playback of the video advertisement—for a duration of the pause event. In this implementation, the ad platform can therefore enable the user, viewing the video advertisement, to capture the identifier with a secondary device (e.g., a mobile phone)—such as at any time during playback of the video advertisement—in order to skip playback of the video advertisement, immediately return to viewing the primary content stream at the primary device, and access further ad content, associated with the video advertisement, at the secondary device.

3.1.2 Dynamic Identifier

Additionally or alternatively, in one implementation, the ad platform can selectively trigger rendering of the identifier (e.g., adjacent and/or overlaid frames of the video advertisement) during playback of the video advertisement.

In particular, in this implementation, during a pause event, the ad platform can: trigger playback of a video advertisement—in replacement of playback of a digital video (e.g., a movie, a television show, a digital short) in a primary content stream—in a secondary content stream; and selectively trigger rendering of a scannable identifier (e.g., a QR code)—including a pointer to an electronic document associated with the video advertisement—adjacent and/or overlaid the video advertisement. For example, the ad platform can selectively: render the identifier adjacent frames of the video advertisement over a duration of the pause event and/or a duration of playback of the video advertisement; render the identifier after a fixed duration of playback of the video advertisement and for a remainder of the pause event; or withhold rendering of the identifier throughout the duration of the pause event.

3.1.3 Dynamic Identifier: View Duration

In one implementation, the ad platform can selectively trigger rendering of the identifier within the advertisement card based on a current view duration of the video advertisement.

In particular, in this implementation, the ad platform can selectively trigger rendering of the identifier within the advertisement card in response to the view duration, for the user viewing the video advertisement, exceeding a threshold view duration defined for this particular advertisement card.

For example, at a first time during a pause event, the ad platform can: trigger playback of a video advertisement from a first frame, in a sequence of frames, of the video advertisement within a display of a primary device; and initiate a timer for a fixed duration (e.g., 3 seconds, 5 seconds, 10 seconds). Then, during playback of the video advertisement and in response to expiration of the timer, the ad platform can render a first digital identifier—including a pointer to an electronic document (e.g., a webpage, a landing page within a native application) within the display concurrent playback of the video advertisement.

For example, during a pause event that pauses playback of a primary content stream viewed at a primary device, the ad platform can serve an secondary content stream—including a first advertisement card loaded with a video advertisement and a dynamic identifier linked to an electronic document associated with the video advertisement—to the primary device. At a first time during the pause event, the ad platform can: trigger the primary device to initiate playback of the video advertisement rendered within the image player in the advertisement card; and initiate a timer for a threshold view duration (e.g., 5 seconds, 15 seconds, 20 percent of the video advertisement, 50 percent of the video advertisement) defined for the video advertisement and/or advertisement card. Then, at a second time succeeding the first time, during the pause event, in response to expiration of the timer, the ad platform can trigger the primary device to render the identifier, within the advertisement card, adjacent playback of the video advertisement.

Therefore, in this example, the ad platform can delay rendering of the identifier—configured to enable the user to "skip" viewing of the video advertisement at the primary device responsive to scanning of the identifier—until after the user views at least a threshold duration of the video advertisement. By thus delaying rendering of the identifier within the advertisement card, the ad platform can ensure that the user views at least a minimum proportion of the video advertisement prior to scanning the identifier and skipping playback of the video advertisement at the primary device. The ad platform can therefore: contextualize content loaded within the electronic document linked to the identifier and associated with the video advertisement, prior to a scan event that triggers the scanning device (i.e., the secondary device) to navigate to the electronic document; increase likelihood of the user engaging with content presented within the electronic document rendered on the secondary device in response to the scan event; and/or deter the user from scanning the identifier—such as to skip playback of a remaining segment of the video advertisement—if the user exhibits minimal interest in the video advertisement by limiting the "skippable" portion of the video advertisement.

3.1.4 Dynamic Identifier: Streaming Session

Additionally and/or alternatively, in another implementation, the ad platform can selectively trigger rendering of the identifier within the advertisement card based on a set of engagement metrics recorded for the user viewing the primary content stream during a particular streaming session.

In particular, in this implementation, during a streaming session corresponding to viewing of a primary content stream (e.g., a tv show, a movie) rendered on a display of a primary device, the ad platform can: periodically (e.g., at a fixed frequency, at predefined time intervals, pseudo-randomly) serve advertisement cards—each advertisement card including a video advertisement and a corresponding identifier—within the secondary content stream rendered on the display of the primary device in replacement of the primary content stream; and—for each advertisement card served to the user during the streaming session—access a set of engagement data representing user interactions with advertising content presented within the advertisement card. For example, for a first advertisement card—including a first video advertisement and a first identifier—rendered within the secondary content stream during the streaming session, the ad platform can access a first set of engagement data representing: a view duration or a proportion of the first video advertisement viewed by the user at the primary device; whether the user scanned the first identifier at a secondary device (e.g., mobile phone, tablet); whether the user completed a purchase at the electronic document rendered at the secondary device responsive to the user scanning the first identifier; whether the user completed viewing of the video advertisement at the secondary device; etc. The ad platform can similarly access a set of engagement data for each advertisement card served to the user during the streaming session.

In the preceding implementation, the ad platform can: leverage this series of engagement data—collected during the streaming session—to derive a set of engagement metrics representing engagement of the user with advertising content presented to the user during this particular streaming session; and update the set of engagement metrics throughout the streaming session as additional advertisement cards are served to the user. Then, for a subsequent advertisement card rendered within the secondary content stream during the streaming session, the ad platform can selectively trigger rendering of a corresponding identifier, within the advertisement card, based on the set of engagement metrics derived for the current streaming session.

For example, the ad platform can track a first engagement metric, in a set of engagement metrics, representing a quantity of "skipped" advertisements closed by the user—via scanning of a QR code rendered adjacent a corresponding video advertisement—during the streaming session. The ad platform can then selectively render and/or withhold rendering of a QR code within an advertisement card presented within the secondary content stream based on this quantity of "skipped" advertisements.

In particular, in one example, during a first pause event—within a viewing window of a fixed duration (e.g., 20 minutes, one hour, 24 hours, a single streaming session)—that pauses playback of a primary content stream at a first frame in a first digital video in a primary content stream rendered within a display of a primary device, the ad platform can: trigger playback of a first video advertisement in a secondary content stream (e.g., an secondary content stream); access a quantity of skip events recorded at the primary device during the viewing window; and, in response to the quantity falling below a threshold quantity defined for the viewing window, render a first digital identifier—including a pointer to a first electronic document including content associated with the first video advertisement—within the display concurrent playback of the first video advertisement. Then, during a second pause event—succeeding the first pause event and within the viewing window—that pauses playback of the primary content stream at a second frame in a second digital video in the primary content stream, the ad platform can: trigger playback of a second video advertisement in the secondary content stream; and, during playback of the second video advertisement, in response to the quantity of skip events exceeding the threshold quantity, withhold rendering of a second digital identifier—including a pointer to a second electronic document including content associated with the second video advertisement—within the display during the second pause event.

Additionally or alternatively, in another example, at a first time during a streaming session—corresponding to viewing of a primary content stream (e.g., a tv show, a movie) rendered on a display of a primary device accessed by a user—the ad platform can: serve an secondary content stream loaded with a first advertisement card—including an image player loaded with a first video advertisement and a first QR code arranged adjacent the image player within the first advertisement card—to the primary device for rendering on the display; access a quantity of scan events initiated by the user during the streaming session; and, in response to the quantity of scan events falling below a threshold quantity, trigger the primary device to render the first QR code—adjacent the first video advertisement—within the advertisement card for a duration of playback of the first video advertisement. Then, in response to the user scanning the first QR code with a secondary device, the ad platform can update the quantity of scan events derived for the streaming session. Later, at a second time during the streaming session, the ad platform can: serve the secondary content stream loaded with a second advertisement card—including an image player loaded with a second video advertisement and a second QR code arranged adjacent the image player within the second advertisement card—to the primary device for rendering on the display; access the quantity of scan events initiated by the user during the streaming session; and, in response to the quantity of scan events exceeding the threshold quantity, trigger the primary device to withhold rendering of the second QR code within the second advertisement card, such as during playback of a duration of the second video advertisement and/or during playback of a first segment of the second video advertisement.

4. Scan Event

In response to a scan event that captures the identifier—rendered adjacent the video advertisement within the advertisement card rendered on the display of the primary device—at a secondary device accessed by the user, the ad platform can: receive a request for content—specifying the identifier—from the secondary device; trigger termination of playback of the video advertisement and resuming of playback of the primary content stream at the primary device based on a device code contained in the identifier; and trigger the secondary device to navigate to the electronic document linked to the video advertisement based on a pointer contained in the identifier.

The ad platform can therefore incentivize the user to further engage with the video advertisement by encouraging the user to scan the identifier—and thereby access playback of the video advertisement and/or additional advertising content related to the video advertisement at the secondary device—in order to skip playback of the video advertisement (e.g., the complete video advertisement and/or a portion of the video advertisement) at the primary device and continue viewing playback of the primary content stream.

4.1 Enabling Skipping of Video Advertisements

In one implementation, the ad platform can selectively enable and/or disable "skipping" or terminating of playback of video advertisements responsive to scan events.

In this implementation, the ad platform can continue to render the identifier within the advertisement card—regardless of whether "skipping" of advertisements is enabled or disabled at the primary device—such that the user may continue to access additional content related to these advertisement cards. Therefore, if a user scans a QR code rendered adjacent a video advertisement presented within the secondary content stream while ad "skipping" is disabled at the primary device, the ad platform can infer that this user is highly-engaged with content presented within the video advertisement and leverage this information to inform future serving of ad content to this particular primary device.

4.1.1 View Duration

In one implementation, the ad platform can selectively enable termination of playback of video advertisements based on a duration of the video advertisement viewed by the user within the secondary content stream.

For example, at a first time, during a pause event that pauses playback of the primary content stream, the ad platform can: serve an secondary content stream loaded with an advertisement card—including a video advertisement and a QR code arranged adjacent the video advertisement—to the primary device; and trigger playback of the video advertisement within the advertisement card. Then, at a second time, in response to a scan event that captures the QR code at a mobile device, the ad platform can: receive a request for advertising content, from the secondary device, specifying the identifier; access a duration of playback of the video advertisement at the primary device; and, in response to the duration falling below a threshold duration, continue playback of the video advertisement at the primary device and trigger the secondary device to navigate to a landing page linked to the QR code. Alternatively, at the second time, in response to the duration of playback of the video advertisement at the primary device exceeding the threshold duration, the ad platform can automatically terminate playback of the video advertisement at the primary device and trigger the primary device to resume playback of the primary content stream accordingly.

4.1.2 Quantity of "Skip" Events

Additionally or alternatively, in another implementation, the ad platform can selectively enable "skipping" of advertisements presented to the user within the secondary content stream based on a quantity of advertisements previously skipped at the primary device (e.g., by the user) during a current streaming session and/or during a preceding time period (e.g., 1 hour, 2 hours, 24 hours).

In particular, in one example, during a first pause event within a streaming session that pauses playback of a primary content stream—rendered within a display of a primary device—at a first frame in a digital video in the primary content stream, the ad platform can: trigger playback of a first video advertisement in a secondary content stream within an image player arranged within a first subregion of the display; render a first digital identifier—including a first pointer to a first electronic document including content associated with the first video advertisement and a including a device code associated with the primary device—within a second subregion of the display; and, in response to a first scan event that captures the first digital identifier and initiated at a secondary device distinct from the primary device, receive a first request—specifying the first identifier—for content from the secondary device; trigger the secondary device to navigate to the first electronic document based on the first pointer; pause playback of the first video advertisement within the secondary content stream based on the device code; and trigger playback of the first digital video in the primary content stream at the primary device. Then, in response to triggering playback of the digital video in the primary content stream at the primary device, the ad platform can: flag a first skip event; and update a quantity of skip events flagged during the streaming session based on the first skip event. Later, during a second pause event—succeeding the first pause event within the streaming session—that pauses playback of the primary content stream at a second frame in the digital video, the ad platform can: trigger playback of a second video advertisement in the secondary content stream within the image player; render a second digital identifier—including the device code and a second pointer to a second electronic document including content associated with the second video advertisement—within the second subregion of the display during playback of the second video advertisement; in response to a second scan event that captures the second digital identifier and initiated at the secondary device, receive a second request for content—specifying the second identifier—from the secondary device, the second request specifying the second identifier; and trigger the secondary device to navigate to the second electronic document based on the second pointer. Then, the ad platform can: access the quantity of skip events recorded during the streaming session; and, in response to the quantity exceeding a threshold quantity, continue playback of the second video advertisement within the image player at the primary device.

4.1.3 Variation: "Skip" Feature within Landing Page

Additionally and/or alternatively, in one variation, the ad platform can modify the landing page to include a selectable feature (e.g., a digital icon) configured to trigger termination of playback (or "skipping") of the video advertisement at the primary device responsive to selection of this selectable feature by the user at the secondary device. The ad platform can therefore encourage the user to engage with content rendered within the landing page in order to access this selectable "skip" feature.

For example, during a pause event that pauses playback of a digital video in the primary content stream—viewed within a display of a primary device accessed by a user—the ad platform can: trigger playback of a video advertisement in a secondary content stream within an image player arranged within the display; render a digital identifier—including a pointer to an electronic document including content associated with the video advertisement and including a device code associated with the primary device—within the display concurrent playback of the video advertisement. Then, in response to a scan event that captures the digital identifier and initiated at a secondary device accessed by the user, the ad platform can: trigger the secondary device to navigate to the electronic document—including a selectable feature (e.g., an icon, a link, a banner) configured to trigger termination of playback of the video advertisement responsive to selection at the secondary device based on the device code—based on the pointer; and, in response to selection (e.g., via click, swipe) of the selectable feature, pause playback of the video advertisement within the secondary content stream and trigger playback of the digital video in the primary content stream at the primary device. Alternatively, in response to the user withholding selection of the selectable feature within the electronic document, the ad platform can continue playback of the video advertisement at the primary device.

4.2 Scan Event: Landing Page

In response to a scan event that captures the identifier—rendered within an advertisement card rendered on the primary device—at a secondary device accessed by the user, the ad platform can trigger the secondary device to navigate to an electronic document (e.g., a landing page) loaded with content associated with the advertisement card and/or video advertisement.

For example, the identifier can include a pointer to an electronic document (e.g., a landing page within a native application, a webpage): including an image player configured to enable playback of the video advertisement at the secondary device, such that the user may continue viewing of the video advertisement on her own time; including an image player loaded with a new video advertisement—such as a next video advertisement in an advertising campaign—configured to encourage further engagement of the user with advertising content related to the advertising campaign; loaded with a digital "shopping cart" configured to enable the user to purchase a product or products advertised within the video advertisement; and/or corresponding to a brand associated with the video advertisement.

In particular, in one example, in response to a scan event that captures the identifier—rendered concurrent playback of the video advertisement within a display of the primary device accessed by the user—the ad platform can: pause playback of the video advertisement at a first frame, in a sequence of frames, of the video advertisement within the secondary content stream; and trigger the secondary device to navigate to the electronic document—loaded with an image player—linked to the identifier. The ad platform can then: load frames of the video advertisement into the image player; render the first frame of the video advertisement within the image player; and trigger playback of the video advertisement—forward from the first frame—within the image player within the electronic document at the secondary device.

Alternatively, in another example, in response to a scan event that captures an identifier—rendered adjacent playback of a video advertisement within a display of a primary device accessed by a user—at a secondary device accessed by the user, the ad platform can trigger the secondary device to navigate to an electronic document including a digital shopping cart configured to enable purchase of products associated with the video advertisement. In particular, in this example, in response to the video advertisement including content associated with athletic apparel, the ad platform can trigger the secondary device to navigate to an electronic document including a digital shopping cart configured to enable purchase of hiking apparel depicted in the video advertisement.

4.2.1 Dynamic Landing Page

In one implementation, the ad platform can selectively modify the electronic document linked to the identifier. In particular, in this implementation, the identifier can be configured to include a pointer to a dynamic landing page—configured to present advertising content tailored to a particular user, viewing the secondary content stream on a particular primary device during a streaming session. In response to a scan event for this identifier, the ad platform can then selectively modify the dynamic landing page to include a particular set of advertising content that is tailored to this particular user, such as based on engagement data collected for this user during a current streaming session.

In one example, the ad platform can tailor the dynamic landing page served to the user based on a view duration of the user viewing the video advertisement at the primary device prior to scanning of the identifier. In particular, in this example, the ad platform can: serve an secondary content stream loaded with an advertisement card—including an image player loaded with a video advertisement and an identifier arranged adjacent the image player within the advertisement card—to a primary device during a break in playback of a primary content stream (i.e., during a pause event); and trigger playback of the video advertisement at a first time. Then, in response to a scan event that captures the identifier—rendered on the primary device—at a secondary device at a second time succeeding the first time, the ad platform can: calculate a first view duration based on a difference between the second time and the first time; and, in response to the first view duration falling below a lower threshold duration, trigger the secondary device to navigate to a first landing page including an image player loaded with the video advertisement.

Alternatively, in the preceding example, in response to the first view duration falling below an upper the duration and exceeding the lower threshold duration, the ad platform can trigger the secondary device to navigate to a second landing page including an image player loaded with a second video advertisement, such as a next video advertisement in an advertising campaign including the initial video advertisement. Alternatively, in response to the first view duration exceeding the upper threshold duration, the ad platform can trigger the secondary device to navigate to a third landing page including a digital checkout portal configured to enable purchases of products advertised in the video advertisement. In this example, the ad platform can therefore tailor the landing page served to the secondary device based on the view duration recorded for the video advertisement, which may be indicative of the user's interest and/or engagement in advertising content related to the video advertisement.

Alternatively, in another implementation, the identifier can include a pointer to a predefined electronic document, such as loaded with fixed advertising content. In this implementation, in response to a scan event for this identifier, the ad platform can automatically trigger the secondary device to navigate to the predefined electronic document linked to this identifier.

5. Engagement Data+Ad Attribution

The ad platform (or the image player) can track user interactions with advertising content presented to the user at the primary device (e.g., within the secondary content stream) and/or at the secondary device (e.g., within the electronic document). In particular, the ad platform can: collect engagement data (e.g., clicks, scrolls, swipes, viewability, video completion, purchases) related to interactions between the user and advertising content presented within advertisement cards and/or an external electronic document associated with a particular video advertisement within the secondary content stream; and package these engagement data into one or more metrics indicative of user engagement with the secondary content stream. For example, the ad platform can track user interactions with a video advertisement to characterize user engagement with the video advertisement based on: a quantity of inputs (e.g., clicks, swipes, locating of a cursor) over an icon linked to the video advertisement; a proportion of the video advertisement viewed by the user; a quantity of replays of the video advertisement (e.g., at the secondary device); a quantity of user inputs (e.g., clicks, swipes, tilts, gestures) entered by the user in the secondary content stream; a maximum advertisement tier viewed by the user; a duration of time the user spent interacting with the video advertisement; whether an audio stream was played during playback of the video advertisement; whether the user scanned a QR code rendered on the display during playback of the video advertisement; etc.

In one implementation, the ad platform can leverage user interactions with the secondary content stream across multiple devices (e.g., primary devices and/or secondary devices)—such as at the user's smart TV, desktop computer, and/or mobile device—to link these devices to this particular user and therefore link engagement data collected at each of these devices to this particular user (or to the particular primary device accessed by the user). The ad platform can then compile these segregated engagement data—collected at each of these devices accessed by the user—into a singular corpus of engagement data representative of the user's interactions with advertising content across multiple devices accessed by and/or associated with this particular user. The ad platform can then leverage this corpus of engagement data to selectively serve advertising content within the secondary content stream to this particular user and/or primary device.

5.1 Engagement Metrics: Primary Device+Secondary Device

In one implementation, the ad platform can derive: a first set of engagement metrics representing user interactions with content presented to the user within the secondary content stream at the primary device; and a second set of engagement metrics representing user interactions with content presented to the user within the electronic document at the secondary device.

In particular, in this implementation, the ad platform can: trigger playback of a video advertisement in a secondary content stream during a pause event that pauses playback of a digital video in a primary content stream viewed within a display of a primary device accessed by a user; and, during playback of the video advertisement, render a digital identifier—including a device code associated with the primary device and a pointer to an electronic document including content associated with the video advertisement—within the display. Then, in response to a scan event—initiated at a secondary device accessed by the user and distinct from the primary device—that captures the digital identifier, the ad platform can: trigger the secondary device to navigate to the electronic document based on the pointer; and selectively pause the video advertisement and/or trigger playback of the digital video at the primary device, as described above. The ad platform can then: access a set of engagement data (e.g., clicks, swipes, views, purchases) representing user interactions with content presented within the electronic document; derive a first engagement metric representing user engagement with the video advertisement based on the scan event; and derive a second engagement metric—representing user engagement with the electronic document—based on the set of engagement data.

In this implementation, the ad platform can store engagement metrics in a user profile generated for a particular user and/or device (e.g., primary device, secondary device). In particular, in the preceding example, the ad platform can: write the first engagement metric to a session packet associated with the first pause event; write the second engagement metric to the session packet; insert the session packet into a series of session packets generated for the user; and store the series of session packets in a session container associated with the user. In particular, the ad platform can link this session container to a user profile, in a population of user profiles, generated for the user.

The ad platform can then leverage these engagement metrics to selectively serve content to the user within the secondary content stream—viewed on the primary device—and/or within electronic documents accessed at the secondary device responsive to scan events.

5.1.1 Engagement Metrics: Primary Device

In one implementation, the ad platform can derive a set of engagement metrics based on user interactions with content (e.g., video advertisements) presented to the user at the primary device.

For example, the ad platform can: derive a first engagement metric representing user engagement with a first video advertisement—presented to the user in the secondary content stream within a display of a primary device accessed by the user—based on a first scan event that captures an identifier (e.g., a QR code) arranged within the display concurrent playback of the first video advertisement during a first pause event; write the first engagement metric to a session packet associated with the first pause event; and store the session packet in a user profile, in a population of user profiles, associated with the user.

Additionally or alternatively, in another example, the ad platform can: characterize engagement of the user with the first video advertisement based on the first scan event and a first quantity of frames, in the sequence of frames, of the first video advertisement viewed by the user within the first electronic document. In particular, in this example, the ad platform can: trigger playback of a video advertisement—presented to the user in the secondary content stream within a display of a primary device accessed by the user—at a first time during a pause event; and render an identifier adjacent the video advertisement within the display. The, in response to a scan event—initiated at a secondary device at a second time succeeding the first time by a first duration—that captures the identifier rendered within the display of the primary device, the ad platform can: pause playback of the video advertisement within the display of the primary device; trigger playback of a digital video—in replacement of the video advertisement—in the primary content stream at the primary device; and derive a first engagement metric—representing user engagement with the first video advertisement—based on the first scan event and the first duration.

5.1.2 Engagement Metrics: Secondary Device

Additionally or alternatively, in another implementation, the ad platform can derive a set of engagement metrics based on user interactions with content (e.g., an electronic document) presented to the user at the secondary device responsive to a scan event initiated at the secondary device.

In particular, in this implementation, the ad platform can: trigger playback of a video advertisement—presented to the user in the secondary content stream within a display of a primary device accessed by the user—during a pause event; render an identifier—including a pointer to an electronic document including content associated with the video advertisement—adjacent the video advertisement within the display; and, in response to a scan event initiated at a secondary device and that captures the identifier rendered within the display of the primary device, trigger the secondary device to navigate to the electronic document. Then, the ad platform can: access a set of engagement data—such as including a quantity of clicks and/or swipes, a view duration for video content, whether a user viewed various content included in the electronic document, whether the user purchased a product associated with the video advertisement, etc.—representing user interactions with content presented within the electronic document; and derive an engagement metric representing user engagement with the electronic document based on the set of engagement data.

5.2 User Profile: Linking Primary & Secondary Device

In one implementation, the ad platform can link a particular secondary device (e.g., a smartphone, a tablet) to the primary device (e.g., a primary device). The ad platform can then associate the primary device and the secondary device with a user profile associated with the user and/or household viewing the primary content stream on the primary device.

In particular, in this implementation, the ad platform can: trigger playback of a video advertisement—presented to the user in a secondary content stream within a display of a primary device accessed by the user—during a pause event; render a first identifier (e.g., a QR code)—including a pointer to an electronic document including content associated with the video advertisement and a device code associated with the primary device—adjacent the video advertisement within the display; and, in response to a scan event that captures the first identifier and initiated at a secondary device accessed by the user (e.g., distinct from the primary device), receive a request for content from the secondary device, the first request specifying the first identifier and a second identifier (e.g., a device identifier) associated with the secondary device. Then, in response to the request specifying the first identifier, the ad platform can: access a user profile, in a population of user profiles, associated with the user based on the device code included in the first identifier; and link the second identifier—associated with the secondary device—to the user profile. The ad platform can therefore associate the user with both the primary device and the secondary device.

In one variation, the ad platform can associate multiple secondary devices—such as accessed by different users within a single household—with a primary device. Furthermore, in this variation, the ad platform can derive and store unique engagement metrics for each user, in a set of users, associated with a particular primary device based on identification of a particular secondary device, in a set of secondary devices, accessed by the user. The ad platform can then leverage identification of a particular user viewing the primary content stream—based on identification of a secondary device accessed by the user and initiating one or more scan events—to derive engagement metrics for this particular user and tailor advertising content served to this user within the secondary content stream and/or at the secondary device responsive to scan events.

For example, a first user and a second user may view streaming content on a (shared) primary device (e.g., a smart tv). The first user may view streaming content within a first primary content stream—such as by selecting a first viewing profile within a streaming platform—and the first user may view content within a first primary content stream. In this example, during a first time period, the first user may select a first digital video (e.g., a television show, a movie) for viewing within the first primary content stream at the primary device. Then, during a first pause event that pauses playback of the first digital video, within the first primary content stream, the ad platform can: trigger playback of a first video advertisement in a first secondary content stream rendered in replacement of the first primary content stream; and render a first identifier—including a device code associated with the primary device and a pointer to a first electronic document including content associated with the first video advertisement—adjacent the first video advertisement within the first secondary content stream. Then, in response to a first scan event that captures the first identifier at a first secondary device (e.g., a smartphone, a tablet) accessed by the first user, the ad platform can: receive a first request for content—the first request specifying the device code and a second identifier associated with the first secondary device—from the first secondary device; generate a first user profile, in a set of user profiles, associated with the first user; link the device code to the first user profile to associate the primary device with the first user; and link the second identifier—associated with the first secondary device accessed by the first user—to the first user profile to associate the secondary device with the first user.

Later, in the preceding example, the second user may view streaming content within a second primary content stream—such as by selecting a second viewing profile within the streaming platform—and the second user may view content within a second primary content stream. In this example, during a second time period, the second user may select a second digital video for viewing within the second primary content stream at the primary device. Then, during a second pause event that pauses playback of the second digital video, within the second primary content stream, the ad platform can: trigger playback of a second video advertisement in a second secondary content stream rendered in replacement of the second primary content stream; and render a second identifier—including the device code associated with the primary device and a pointer to a second electronic document including content associated with the second video advertisement—adjacent the second video advertisement within the second secondary content stream. Then, in response to a second scan event that captures the second identifier at a second secondary device accessed by the second user, the ad platform can: receive a second request for content—the second request specifying the device code and a third identifier associated with the second secondary device—from the second secondary device; generate a second user profile, in the set of user profiles, associated with the second user; link the device code to the second user profile to associate the primary device with the second user; and link the third identifier—associated with the second secondary device accessed by the second user—to the second user profile to associate the second secondary device with the second user.

6. First & Second Pause Event

In one variation, the ad platform can leverage historical engagement data—representing user engagement with content presented to the user during an initial pause event—to select content for presenting to the user during a subsequent pause event preceding the initial pause event. In particular, in this variation, the ad platform can leverage insights derived from these engagement data to inform selection of future video advertisements and/or other advertising content—such as presented within electronic documents served to the user's secondary device responsive to a scan event—for serving to this user in order to increase a likelihood of achieving a target outcome (e.g., brand lift, conversion, viewability, VCR) associated with this advertising content.

6.1 Tailored Content at the Primary Device

In one implementation, the ad platform can leverage historical engagement data collected for a particular user to selectively serve video advertisements within the secondary content stream presented to the user during pause events at the primary device.

In particular, in this implementation, the ad platform can: derive a first engagement metric representing user engagement with a first video advertisement—presented to the user within the secondary content stream rendered at the primary device during a first pause event—based on a first scan event that captures a first identifier rendered concurrent playback of the first video advertisement during the first pause event; based on the first engagement metric, select a second video advertisement, in a set of video advertisements, for presenting to the user within the secondary content stream during a next pause event succeeding the first pause event; and, during a second pause event succeeding the first pause event, automatically trigger playback of the second video advertisement in the secondary content stream within the display of the primary device.

In one example, the ad platform can: during a first pause event, trigger playback of a first video advertisement—presented to the user in a secondary content stream within a display of a primary device—in a first campaign (e.g., an advertising campaign) associated with a first brand; render a first identifier—including a first pointer to a first electronic document including content associated with the first video advertisement—adjacent the first video advertisement within the display; in response to a first scan event that captures the first identifier at a secondary device accessed by the user, receive a request for content from the secondary device and trigger the secondary device to navigate to the first electronic document accordingly; and access a set of engagement data—representing user interactions with the first electronic document—recorded at the first electronic document rendered at the secondary device. The ad platform can then derive a set of engagement metrics—representing user engagement with content associated with the first video advertisement—based on the first scan event and the set of engagement data. Then, during a second pause event succeeding the first pause event, the ad platform can: based on the set of engagement metrics, select a second video advertisement, in the first campaign, for presenting to the user within the secondary content stream; and automatically trigger playback of the second video advertisement in the secondary content stream rendered at the primary device during the second pause event. Alternatively, the ad platform can: based on the set of engagement metrics, select a second video advertisement, in a second campaign—in replacement of the first campaign—associated with a second brand; and automatically trigger playback of the second video advertisement in the secondary content stream.

The ad platform can therefore automatically select and/or queue a next video advertisement for serving to the user within the secondary content stream based on engagement data captured responsive to serving a first video advertisement and/or electronic document to the user. In particular, based on this engagement data, the ad platform can derive insights into the user's interest and select video advertisements—for serving to the user—predicted to align with the user's interest and therefore yield a target outcome defined by these video advertisements.

6.2 Tailored Content at the Secondary Device

Additionally or alternatively, in one implementation, the ad platform can leverage historical engagement data collected for a particular user to selectively serve electronic documents—loaded with various types of content—to the user responsive to scan events.

For example, during a first pause event, the ad platform can: trigger playback of a first video advertisement—presented to the user in a secondary content stream within a display of a primary device—in a first campaign (e.g., an advertising campaign); render a first identifier—including a first pointer to a first electronic document including content associated with the first video advertisement—adjacent the first video advertisement within the display; and, in response to a first scan event that captures the first identifier at a secondary device accessed by the user, receive a request for content from the secondary device and trigger the secondary device to navigate to the first electronic document accordingly. In particular, in this example, the ad platform can trigger the secondary device to navigate to the first electronic document including an image player loaded with the first video advertisement and configured to continue playback of the first video advertisement within a display of the secondary device for viewing by the user. Then, the ad platform can: access a set of engagement data—representing user interactions with the first electronic document—recorded at the first electronic document rendered at the secondary device; and derive a set of engagement metrics—representing user engagement with content associated with the first video advertisement—based on the first scan event and the set of engagement data.

In response to the set of engagement metrics anticipating a target outcome defined by the first campaign, the ad platform can select a second video advertisement, in the first campaign, for serving to the user during a next pause event. Furthermore, during the next pause event, the ad platform can: trigger playback of the second video advertisement—such as identical and/or distinct from the first video advertisement and in the first campaign—presented to the user in the secondary content stream within the display of the primary device; render a second identifier—including a second pointer to a second electronic document including content associated with the second video advertisement—adjacent the second video advertisement within the display; and, in response to a first scan event that captures the second identifier at the secondary device, receive a second request for content from the secondary device and trigger the secondary device to navigate to the second electronic document accordingly. In particular, in this example, the ad platform can trigger the secondary device to navigate to the second electronic document including a digital shopping cart configured to enable purchase of products or goods associated with the first campaign. The ad platform can therefore incrementally drive the user toward completing a purchase—and/or towards achieving any other target outcome—at the secondary device by tailoring content presented to the user at the secondary device based on engagement metrics derived for this user.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
   during a first pause event that pauses playback of a primary content stream at a first frame in a digital video in the primary content stream, the primary content stream viewed on a display of a primary device accessed by a user, triggering playback of a first video advertisement in a secondary content stream within an image player arranged within a first subregion of the display; and
   during playback of the first video advertisement during the first pause event:
   rendering a first digital identifier within a second subregion of the display, the first digital identifier comprising:
   a first pointer to a first electronic document comprising content associated with the first video advertisement; and
   a device code associated with the primary device; and
   in response to a first scan event that captures the first digital identifier and initiated at a secondary device accessed by the user and distinct from the primary device:
   receiving a first request for content from the secondary device, the first request specifying the first identifier; and
   in response to the first request specifying the first identifier:
   triggering the secondary device to navigate to the first electronic document based on the first pointer;
   pausing playback of the first video advertisement within the secondary content stream based on the device code;
   rendering the first frame in the digital video within the display of the primary device in replacement of the secondary content stream; and
   triggering playback of the digital video in the primary content stream at the primary device.

2. The method of claim 1, further comprising:
   accessing a set of engagement data representing user interactions with content presented within the first electronic document; and
   characterizing engagement of the user with the first video advertisement based on the first scan event and the set of engagement data.

3. The method of claim 1, further comprising:
   in response to triggering playback of the digital video in the primary content stream at the primary device in response to the first request specifying the first identifier:
   flagging a first skip event for a streaming session comprising the first pause event; and
   updating a quantity of skip events flagged during the streaming session based on the first skip event;
   during a second pause event that pauses playback of the primary content stream at a second frame in the digital video, the second pause event succeeding the first pause event within the streaming session, triggering playback of a second video advertisement in the secondary content stream within the image player; and
   during playback of the second video advertisement:
   rendering a second digital identifier within the second subregion of the display, the second digital identifier comprising:
   a second pointer to a second electronic document comprising content associated with the second video advertisement; and
   the device code associated with the primary device; and
   in response to a second scan event that captures the second digital identifier and initiated at the secondary device:
   receiving a second request for content from the secondary device, the second request specifying the second identifier; and
   in response to the second request specifying the second identifier:
   triggering the secondary device to navigate to the second electronic document based on the second pointer;

accessing the quantity of skip events recorded during the streaming session; and in response to the quantity exceeding a threshold quantity, continuing playback of the second video advertisement within the image player at the primary device.

4. The method of claim 1:

wherein triggering playback of the first video advertisement comprises:

at a first time, triggering playback of the first video advertisement from a first frame, in a sequence of frames, of the first video advertisement; and at the first time, initiating a timer for a fixed duration; and wherein rendering the first digital identifier within the second subregion of the display during the first pause event comprises, in response to expiration of the timer, rendering the first digital identifier within the second subregion of the display.

5. The method of claim 1:

wherein triggering playback of the first video advertisement during the first pause event comprises triggering playback of the first video advertisement during the first pause event within a viewing window of a fixed duration;

wherein rendering the first digital identifier within the second subregion of the display during the first pause event comprises:

accessing a quantity of skip events recorded during the viewing window; and in response to the quantity falling below a threshold quantity defined for the viewing window, rendering the first digital identifier within the second subregion of the display; and further comprising:

during a second pause event that pauses playback of the primary content stream at a second frame in a second digital video in the primary content stream, triggering playback of a second video advertisement in the secondary content stream within the image player, the second pause event within the viewing window; and during playback of the second video advertisement, in response to the quantity of skip events exceeding the threshold, withholding rendering of a second digital identifier within the second subregion of the display, the second digital identifier comprising a second pointer to a second electronic document comprising content associated with the second video advertisement and the device code associated with the primary device.

6. The method of claim 1:

wherein receiving the first request for content from the secondary device comprises receiving the first request for content from the secondary device, the first request specifying the first identifier, comprising the device code associated with the primary device, and a second identifier associated with the secondary device; and further comprising, in response to the first request specifying the first identifier and the second identifier:

accessing a user profile, in a population of user profiles, associated with the user based on the device code; and associating the second identifier associated with the secondary device with the user profile.

7. The method of claim 1, wherein triggering the secondary device to navigate to the first electronic document comprises triggering the secondary device to navigate to the first electronic document comprising a digital shopping cart configured to enable purchase of products associated with the first video advertisement.

8. The method of claim 1:

wherein pausing playback of the first video advertisement within the secondary content stream comprises pausing playback of the first video advertisement at a first frame, in a sequence of frames, of the first video advertisement within the secondary content stream; and wherein triggering the secondary device to navigate to the first electronic document further comprises:

triggering the secondary device to navigate to the first electronic document comprising a second image player loaded with frames of the first video advertisement;

rendering the first frame of the first video advertisement within the second image player; and triggering playback of the first video advertisement, from the first frame, within the second image player.

9. The method of claim 1, further comprising:

deriving a first engagement metric, in a set of engagement metrics, representing user engagement with the first video advertisement based on the first scan event;

accessing a set of engagement data captured at the secondary device and representing user interactions with content presented within the first electronic document;

deriving a second engagement metric, in the set of engagement metrics, representing user engagement with the first electronic document based on the set of engagement data;

storing the set of engagement metrics in a session packet associated with the first pause event; and storing the session packet in a first user profile, in a population of user profiles, associated with the user.

10. The method of claim 1:

wherein triggering the secondary device to navigate to the first electronic document comprises triggering the secondary device to navigate to the first electronic document comprising a selectable feature configured to trigger termination of playback of the first video advertisement responsive to selection at the secondary device based on the device code; and wherein pausing playback of the first video advertisement within the secondary content stream comprises pausing playback of the first video advertisement within the secondary content stream in response to selection of the selectable feature within the first electronic document.

11. The method of claim 2:

wherein characterizing engagement of the user with the first video advertisement based on the first scan event and the set of engagement data comprises deriving a set of engagement metrics representing engagement of the user with the first video advertisement based on the first scan event and the set of engagement data; and further comprising, based on the set of engagement metrics, selecting a second video advertisement, in a set of video advertisements, for presenting to the user in the secondary content stream during a second pause event that pauses playback of the primary content stream at a second frame in the digital video, the second pause event succeeding the first pause event.

12. The method of claim 6:

wherein triggering playback of the first video advertisement in the secondary content stream during the first pause event that pauses playback of the primary content stream comprises triggering playback of the first video advertisement in the secondary content stream during the first pause event that pauses playback of the primary content stream associated with the first user profile; and further comprising:
during a second pause event that pauses playback of a second primary content stream at a second frame in a second digital video in the second primary content stream, triggering playback of a second video advertisement in a second secondary content stream within the image player arranged within the display, the second primary content stream viewed on the display of the primary device accessed by a second user and associated with a second user profile associated with the second user; and
during playback of the second video advertisement during the second pause event:
rendering a second digital identifier within the second subregion of the display, the second digital identifier comprising:
a second pointer to a second electronic document comprising content associated with the second video advertisement; and
the device code associated with the primary device; and
in response to a second scan event that captures the second digital identifier and initiated at a second secondary device accessed by the second user and distinct from the primary device:
receiving a second request for content from the second secondary device, the second request specifying the first identifier and a third identifier associated with the second secondary device; and
in response to the second request specifying the first identifier:
in response to the second request specifying the third identifier, associating the third identifier with the second user profile;
triggering the second secondary device to navigate to the second electronic document based on the second pointer;
pausing playback of the second video advertisement within the second secondary content stream based on the device code;
rendering the second frame in the second digital video within the display of the primary device in replacement of the second secondary content stream; and
triggering playback of the second digital video in the second primary content stream at the primary device.

13. The method of claim 8, further comprising, characterizing engagement of the user with the first video advertisement based on the first scan event and a first quantity of frames, in the sequence of frames, of the first video advertisement viewed by the user within the first electronic document.

14. A method comprising:
during a first pause event that pauses playback of a digital video viewed on a display of a primary device:
loading frames of a first video advertisement into an image player arranged within a first subregion of the display;
triggering playback of the first video advertisement within the image player; and
rendering a first digital identifier within a second subregion of the display, the first digital identifier comprising a first pointer to a first electronic document comprising content associated with the first video advertisement;
during playback of the first video advertisement during the first pause event, in response to a first scan event that captures the first digital identifier and initiated at a secondary device distinct from the primary device:
triggering the secondary device to navigate to the first electronic document based on the first pointer;
pausing playback of the first video advertisement based on the first digital identifier; and
triggering playback of the digital video, in replacement of the first video advertisement, at the primary device; and
in response to triggering the secondary device to navigate to the first electronic document:
accessing a first set of engagement data representing user interactions with content presented within the first electronic document;
deriving a first engagement metric representing user engagement with the first video advertisement based on the first scan event; and
deriving a second engagement metric representing user engagement with the first electronic document based on the first set of engagement data.

15. The method of claim 14, further comprising:
storing the first engagement metric in a first session packet associated with the first pause event;
storing the second engagement metric in the first session packet; and
storing the first session packet, in a series of session packets, in a user profile, in a population of user profiles, associated with the user.

16. The method of claim 14:
wherein triggering playback of the first video advertisement within the image player comprises triggering playback of the first video advertisement within the image player at a first time;
wherein pausing playback of the first video advertisement in response to the first scan event initiated at the secondary device comprises pausing playback of the first video advertisement in response to the first scan event initiated at the secondary device at a second time succeeding the first time by a first duration; and
wherein deriving the first engagement metric representing user engagement with the first video advertisement based on the first scan event comprises deriving the first engagement metric representing user engagement with the first video advertisement based on the first scan event and the first duration.

17. The method of claim 14, further comprising:
based on the set of engagement metrics, selecting a second video advertisement, in a set of video advertisements, for presenting to the user within the secondary content stream; and
during a second pause event that pauses playback of the primary content stream at a second frame in the digital video, the second pause event succeeding the first pause event:
triggering playback of the second video advertisement in the secondary content stream within the image player; and
during playback of the second video advertisement during the second pause event, rendering a second digital identifier within the second subregion of the display, the second digital identifier comprising:
- a second pointer to a second electronic document comprising content associated with the second video advertisement; and
- the device code associated with the primary device.

18. The method of claim 17:
- wherein triggering playback of the first video advertisement in the secondary content stream comprises triggering playback of the first video advertisement, in a first campaign associated with a first brand, in the secondary content stream; and
- wherein selecting the second video advertisement for presenting to the user within the secondary content stream based on the set of engagement metrics comprises, based on the set of engagement metrics, selecting the second video advertisement, in the first campaign associated with the first brand, for presenting to the user within the secondary content stream.

19. The method of claim 17:
- wherein triggering playback of the first video advertisement in the secondary content stream comprises triggering playback of the first video advertisement, in a first campaign associated with a first brand, in the secondary content stream; and
- wherein selecting the second video advertisement for presenting to the user within the secondary content stream based on the set of engagement metrics comprises, based on the set of engagement metrics, selecting the second video advertisement, in a second campaign associated with a second brand, for presenting to the user within the secondary content stream, the second campaign distinct from the first campaign.

20. A method comprising:
- during a pause event that pauses playback of a digital video in a primary content stream rendered within a display of a primary device:
  - triggering playback of a video advertisement in a secondary content stream within an image player arranged within a first subregion of the display, the secondary content stream rendered in replacement of the primary content stream during the pause event; and
  - rendering a digital identifier within a second subregion of the display, the digital identifier comprising a pointer to an electronic document comprising content associated with the video advertisement; and
- during playback of the video advertisement during the pause event, in response to a first scan event that captures the digital identifier and initiated at a secondary device distinct from the primary device:
  - pausing playback of the video advertisement;
  - rendering the first frame in the digital video within the display of the primary device in replacement of the secondary content stream;
  - triggering playback of the digital video in the primary content stream at the primary device; and
  - triggering the secondary device to navigate to the electronic document based on the pointer.

* * * * *